Figure 1:
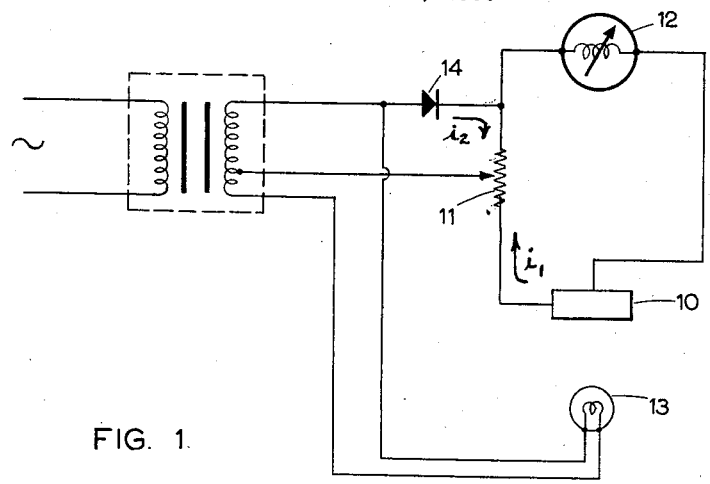

Jan. 26, 1960  P. J. A. TURNER ET AL  2,922,891
LIGHT SENSITIVE DEVICES
Filed Oct. 31, 1956

P.J.A.TURNER &
T.G.BROWN
INVENTORS
BY
ATTORNEYS

United States Patent Office 2,922,891
Patented Jan. 26, 1960

2,922,891

LIGHT SENSITIVE DEVICES

Peter J. A. Turner and Thomas G. Brown, Hillington, Glasgow, Scotland, assignors to Kelvin & Hugh Limited, Hillington, Glasgow, Scotland Application October 31, 1956, Serial No. 619,576

Claims priority, application Great Britain November 1, 1955

9 Claims. (Cl. 250—205)

This invention relates to apparatus of the type suitable for detecting measuring, indicating and/or recording degrees of opacity, for example for measuring the density of smoke or the variation of the colour of a liquid, such measurement being carried out by the observation of the effect of the variation of illumination of a light sensitive device such as a photoe-electric cell comprising part of the apparatus.

In the measurement of smoke density, variations in density are detected by the variation in illumination of a photo-electric cell caused by the presence of smoke in the path of an illuminating beam acting on the cell. If there is no smoke present in the path between the light source and the photo-electric cell, then there will be no interference with the light beam falling on the photo-electric cell and it is usually arranged that a meter and/or recording instrument actuated by the output current from the cell should give a zero reading in such a condition. Thus the full output current from the photo-electric cell indicates a "no smoke" condition.

It will be seen that the accuracy of such measuring apparatus depends on the stability of the light output from the light source and this light output is very sensitive to power supply mains voltage fluctuations. For instance, in tungsten filament lamps light output may increase approximately as the cube of the power supply mains voltage input. In this way apparatus of the type referred to is subject to considerable error due to zero drift caused by power supply mains voltage fluctuations. In addition, certain photo-electric cells, for instance the emission type cells, are also voltage sensitive and any amplifier used in the circuit of such measuring apparatus may also be voltage sensitive.

It is an object of this invention to provide apparatus of the type specified whereby errors caused by voltage fluctuation are substantially eliminated.

In accordance with this invention there is provided apparatus of the type referred to which comprises a light source, electric supply means for supplying electric current to said source, an electric circuit incorporating a light sensitive device acted upon by said light source, an indicating, controlling, warning or recording instrument and means for injecting into the circuit a compensating voltage which varies the sensitivity of the light sensitive device in inverse proportion to fluctuations in the output from the light source due to voltage fluctuations in the electric suply means, the injected voltage being derived from the electric supply means.

As the injected voltage is derived from the same source as that which supplies the light source, said means may be arranged to cause the injected voltage to fluctuate in a linear or non-linear proportion to the fluctuation of the supply to said light source.

It is to be understood that the term "light" wherever used in this specification may refer to light of any wavelength, including light of mixed wavelengths and infra-red radiations.

With the selenium type cell the use of the linear proportionality of the fluctuations is effective even though the light output from the tungsten lamp may vary proportionally to something between the cube and the fourth power of supply volts. This is because these cells, when illuminated, suffer a change of resistance as well as a generation of E.M.F. but ot obtain compensation it is necessary that the injected reverse voltage should be rather large i.e. in the region of 50% of the generated E.M.F. of the cell.

The application of such a reverse potential through the light sensitive device reduces the sensitivity of the device and it is possible to adjust this applied potential to a value at which fluctuations in mains voltage cause a reduction of the sensitivity of the light sensitive device which substantially counteracts changes in illumination which result from the fluctuations of the mains voltage supply to the light source.

As the reverse or injected voltage is rather large the sensitivity of the selenium cell is reduced by about 30% which means that it is necessary to throw a rather intense light on to the cell in order to dispense with the use of an amplifier.

For certain purposes however it is preferred to provide an arrangement in which the injected voltage fluctuates in non-linear proportion to the electric supply, and desirably the injected voltage fluctuates inversely but to the same degree that the light emission varies with the electric suply voltage. This may be achieved by including a suitable type of resistor in the circuit or by including a rectifier and arranging the voltage supply to the rectifier to be such as to operate at the appropriate part of the characteristic curve thereof.

A preferred embodiment of the invention will now be described with reference to the accompanying drawing in which the variations in intensity of a light beam falling on a photo-electric cell are recorded, such variations being caused by the presence, for instance, of smoke particles in the light beam.

Figure 2:
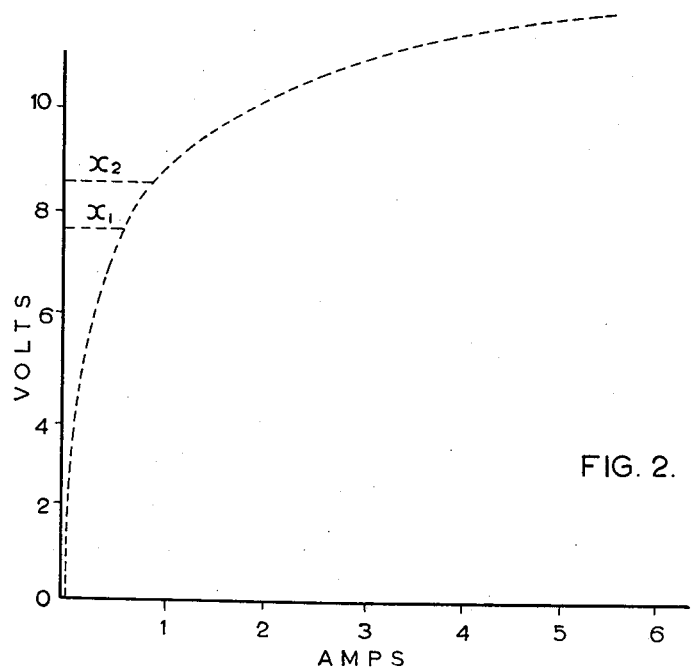

Figure 1 is a circuit diagram of the preferred method of carrying out the invention; and Figure 2 of the drawings shows the voltage current characteristics of a rectifier operated at a low voltage and supplying a small impedance and is used in the carrying out of the invention, the rectifier in this example being rated at 110 volts.

A photo-electric cell 10 of the selenium barrier layer type, which is photo-conductive and photo-generative, is connected in series with a resistor 11 and an indicating instrument such as a micro-ammeter 12 comprising a first circuit. This cell is acted upon by a light beam from a tungsten filament lamp 13. The resistor 11 in the circuit containing the photo-electric cell and indicating instrument, is common to a second circuit in which current from the same source of supply as that which operates the tungsten filament lamp is caused to flow through the resistor and hence a voltage is applied to the photo-electric cell in the direction opposing that of the E.M.F. generated by the cell as a result of the action on it of the illuminating beam. This second circuit incorporates a rectifier 14 and is supplied from the secondary winding of a transformer or from "variac" (registered trademark) 15. The common resistor 11 is provided with a slider so that the compensating or injected voltage is easily varied. As the resistance 11 is common to both first and second circuit portions the respective local currents $i_1$ and $i_2$ oppose each other in resistance 11 and produce the compensating effect to eliminate the error injected by voltage fluctuation modified by the characteristic curve of rectifier 14 shown in Figure 2. Once common resistor 11 is set at a desired value it may thereafter be regarded as a fixed resistance for circuit operation purposes. In accordance with usual practice a relay position to the solid line position of Fig. 6, with such increasing imposition of force on the button as to cause switch 20 to close, the pump motor operates impeller 49 and the liquid level falls accordingly, the chamber 63 being subject to the suction at the intake of the impeller. Prior to this, the chamber 63 of the control has been pressurized only upon a rise of the liquid level above the small port 68 in line 64.

As the liquid level falls a partial pressure or vacuum condition becomes effective in chamber 63, which is not materially affected by the small bleeder aperture 68, and this vacuum causes the diaphragm 14 to be held in closing relation to the switch 20. The vacuum is not reduced sufficiently to enable the diaphragm to move away from the switch button and permit the switch to open until the level has dropped beneath the intake, or impeller eye, end of the vacuum line 64. When this occurs, the vacuum in chamber 63 is immediately broken.

The provision of the auxiliary vacuum line 64 is thus seen to constitute a simple and convenient means to materially lengthen the operating cycle of the motor and thus practically dry out the sump before the motor cycle terminates. The optional positioning of the small aperture 68 permits a desired variation in the differential pressurizing of the diaphragm 14 on its opposite sides; and the inverse size proportioning of the larger chamber 63 and smaller vacuum line 64 in relation to the smaller pressure chamber 61 and the larger pressure line 58 affords a further means of timing the installation as to the institution and termination of motor operation.

In reference to Fig. 6, it may be noted that the diaphragm housing or casing 52 is here designed for disposition externally and to one side of a motor housing (not shown), and to this end, a spring clip 70 is affixed to the casing 52 and may snap onto the usual shaft housing 71. However, it will be clear from the foregoing, and it is an important feature of the invention, that the housing or casing 52 need not be mounted to either the pump or its motor, but can be disposed in any convenient location, so long as its pressure tube 58 (and vacuum tube 64 also, if employed) is brought properly into the sump. It follows as another advantage that no part of the housing need be immersed in the sump water.

The control illustrated in Fig. 6 may be, as indicated above, produced as a replacement or adapter unit, for which type of operation the unit has special utility due to certain wiring provisions hereinafter described. The invention as embodied in Fig. 6 also contemplates a modification of the intake tube 58 to the pressurized side of the diaphragm housing or casing 52.

In accordance with this improvement, the tube 58 is, upon installation and proper location relative to the sump, flattened substantially at 58' over a length which will be determined in accordance with the particular installation, the length occurring intermediate the overall length of the tube 58. The outline of the tube, minus the flattened section 58', is shown in dot-dash line in Fig. 6.

Thus, as the sump water level rises, water will rise in the full diameter lower section of the tube 58 and, entering the flattened section 58', its ability to compress air in the chamber 61, for a given increment of water level rise in the sump, is materially diminished. Thus, the interval before the diaphragm 14 operates to close switch 20 is increased, and the pump comes into operation at a later time. The duration of this interval may be controlled by lengthening or shortening the flattened section 58', or varying its flatness or its location.

The control regulation may also be accomplished by a rotative adjustment of the tubular externally threaded mounting fitting 26 of switch 20, which fitting threads directly in a boss 53' of switch housing member 53 and is held by a lock nut 53". By this means the switch button 22 may be positioned variably in relation to diaphragm, thus to regulate the commencement and duration of motor cycles, yet the axial alignment of the button and diaphragm remains unchanged.

In the unit illustrated in Fig. 6 the electrical leads 30 from the switch are brought out through the tubular threaded mounting fitting 26, preferably in the form of a conventional insulated cable 73 leading to a conventional electrical plug-in connector 74, and a type of female electrical socket member 75 is connected in the cable 73 with its socket terminals 76 wired in series with the plug 74 and switch terminals 31. Cable 73 may be of any desired length, so that in applying the control unit as a replacement, all that is necessary to do is to connect the existing electrical motor connector (not shown) of the sump pump in the socket 75, then plug the connector 74 in a suitable electrical outlet socket or box. It is not necessary to make any particular mounting for the control housing 52, and any support on which it may be suspended will suffice. Tubes 58 and 64, if used, are brought to the sump as above described.

Fig. 7 illustrates an alternative type of regulatory provision in the intake tube 58 as a means for determining the cut-in and cut-out time of the pump motor in any particular installation. In this instance, the tube 58 is shaped in a spiral coil 59 of flexible tubing intermediate the top and bottom extremities of the tube. The coil is adapted to be elongated by stretching the same to form the intermediate axially distorted coil portion 60, which in the length of a single coil convolution or two will occupy an axial length much greater than the undistorted coil. Accordingly, a given rise of water level in the sump will be more effective, entering the lower coils 59 and effecting a greater displacement of air for a given liquid rise, than in the uncoiled length. It is then possible, by altering the overall length of the coiled section upon installation, by stretching out the portion 60, to set the motor cut-in and cut-out times as desired. The adaptation of Fig. 7 represents a reversal of the effect of the regulatory means shown in Fig. 6.

Fig. 8 illustrates a further modification operating on the principle of Fig. 7 to accomplish the foregoing purpose. In this instance, an adapter casing or chamber 62 is inserted in the intake tube 58, as by connecting fittings 62' at the top and bottom of the casing. The enlarged volume of the latter occasions an increased compression of air in the pressure chamber 61, as water rises from the lower end of tube 58 into the adapter casing 62, with a corresponding adjustment of the motor cut-in and cut-out interval.

What I claim as my invention is:

1. A control unit for a sump pump or like motor, comprising a housing having a flexible diaphragm subdividing its interior into pressure and switch control chambers on opposite sides of the diaphragm, an elongated liquid intake tube downwardly communicating said pressure chamber with a source of liquid to be pumped, a vacuum line to communicate said control chamber with the intake side of the pump, a switch disposed in said control chamber for actuation by said diaphragm upon pressurization of said pressure chamber, said switch having an operating element facing said diaphragm and operated thereby under the effects of pressure and vacuum in said respective pressure and control chambers, said switch being provided with a threaded mount disposed in coaxial alignment with said operating element, said threaded mount having threaded engagement with said housing for rotative adjustment to variably position said operating element relative to said diaphragm.

2. A control unit for a sump pump or like motor, comprising a housing having a flexible diaphragm subdividing its interior into pressure and switch control chambers on opposite sides of the diaphragm, a liquid intake member downwardly communicating said pressure chamber with a source of liquid to be pumped, a vacuum line to communicate said control chamber with the intake side of the pump, a switch disposed in said other lead in order to adjust the compensating voltage.

6. An apparatus as claimed in claim 5, in which the photo-electric cell is of the photo-emissive type.

7. An apparatus as claimed in claim 5, wherein the photo-electric cell incorporates a control grid.

8. An apparatus for measuring degrees of opacity comprising an electric supply means, a light source connected to said supply means, an electric circuit also connected to said supply means, a photo-conductive transistor connected in said electric circuit, said transistor including a casing having part thereof adapted to admit the light from said light source for producing a current in said circuit, means connected in said electric circuit for measuring the current flow therein, and resistance means having a non-linear voltage/current characteristic connected between said electric circuit and said supply means whereby a compensating voltage is injected into the electric circuit in opposition to the current flow therein and in proportion to the fluctuations in the voltage output of the electric supply means.

9. An apparatus for measuring degrees of opacity comprising an electric supply means, a light source connected to said supply means, an electric circuit also connected to said supply means, a light sensitive device connected in said electric circuit and acted upon by the light output from said light source for producing a current in said circuit, means connected in said electric circuit for measuring the current flow therein, and resistance means having a non-linear voltage/current characteristic connected between said electric circuit and said supply means whereby a compensating voltage is injected into the electric circuit in opposition to the current flow therein and in proportion to the fluctuations in the voltage output of the electric supply means, said resistance means including a temperature sensitive resistor.

References Cited in the file of this patent

UNITED STATES PATENTS

| 2,626,361 | Martine | Jan. 20, 1953 |
| 2,765,986 | Pompetti et al. | Oct. 9, 1956 |